US006785388B1

(12) United States Patent
Kasahara et al.

(10) Patent No.: US 6,785,388 B1
(45) Date of Patent: Aug. 31, 2004

(54) ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM

(75) Inventors: Masao Kasahara, Minoo (JP); Yasuyuki Murakami, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/397,775

(22) Filed: Sep. 16, 1999

(30) Foreign Application Priority Data

Sep. 16, 1998 (JP) ............................................. 10-262036
Apr. 13, 1999 (JP) ............................................. 11-105815

(51) Int. Cl.[7] ............................. H04K 1/00; H04L 9/00
(52) U.S. Cl. ............................................. 380/28; 380/30
(58) Field of Search .................................... 380/30, 28

(56) References Cited

U.S. PATENT DOCUMENTS

| | | | | |
|---|---|---|---|---|
| 4,218,582 A | * | 8/1980 | Hellman et al. | 380/30 |
| 4,399,323 A | * | 8/1983 | Henry | 380/30 |
| 5,220,606 A | * | 6/1993 | Greenberg | 380/43 |
| 6,298,137 B1 | * | 10/2001 | Hoffstein et al. | 380/30 |

FOREIGN PATENT DOCUMENTS

JP    63-036634    2/1988

OTHER PUBLICATIONS

IEEE Transactions on Information Theory vol. IT–26 No. 3 May 1980, "On the Security of the Merkle–Hellman Cryptography Scheme", Adi Shamir Richard E. Zippel.*

The Handbook of Applied Cryptography, pp. 300–304, Alfred J. Menezes 1996.*

Akira Hayashi, "Remarks on the Lagarias–Odlyzko Method", Kanazawa Institute of Technology, Ishikawa–ken, Japan, pp. 1013–1016, ABS only.

Masahiro Yagisawa, "A Public–Key Cryptosystem Based on Diophantine Equation" vol. 31, No. 12, pp. 1852–1858, ABS.

Hideo Shimizu, "On the Security of Kasahara–Murakami Public–Key Cryptosystem" Yokohama Research Center, Telecommunications Advancement Organization of Japan, Yokohama, Japan, pp. 29–35, ABS only.

Sakai, et al., "Notes on Product–Sum Type Public Key Cryptosystem" The Institute of Electronics, Information and Communication Engineers, Technical Report of IEICE, pp. 61–66, ABS only.

* cited by examiner

Primary Examiner—Gregory Morse
Assistant Examiner—Christopher J. Brown
(74) Attorney, Agent, or Firm—Hogan & Hartson, LLP (57) ABSTRACT

An encryption/decryption method applicable to product-sum cryptosystem. This method enables highspeed decryption. A ciphertext $C=m_0B_0+m_1B_1+ \ldots +m_{K-1}B_{K-1}$ is produced from a scalar product of a plaintext vector $m=(m_0, m_1, \ldots, m_{K-1})$ and a base vector $B=(B_0, B_1, \ldots, B_{K-1})$.

24 Claims, 3 Drawing Sheets

ENCRYPTION METHOD, DECRYPTION METHOD, ENCRYPTION/DECRYPTION METHOD, CRYPTOGRAPHIC COMMUNICATIONS SYSTEM, AND COMPUTER USABLE MEDIUM

BACKGROUND OF THE INVENTION

1. Field of the Invention

The present invention relates to an encryption method for converting a plaintext into a ciphertext, and a decryption method for converting a ciphertext into an original plaintext, and more particularly to product-sum cryptosystem.

2. Description of the Related Art

In today's so-called advanced information society, text and image data important from the standpoint of business are transmitted/communicated and processed in the form of electronic data via an infrastructure of computer networks. Such electronic data can be readily reproduced, and it is impossible to distinguish the reproduction from the original, thus placing great importance on the issue of data protection. The realization of computer networks, which satisfy the requisites of "computer resource sharing," "multiple access," and "wide area networking," are essential to the establishment of an advanced information society, but such networks incorporate elements that are inconsistent with the goal of data protection between concerned parties. As an effective technique for eliminating these inconsistencies, attention is focusing on cryptography techniques, which historically have been utilized principally in the military and diplomatic fields.

Cryptography is the exchange of information in such a way that the meaning of that information cannot be understood by anyone other than the authorized parties. In cryptography, the conversion of an original text (plaintext), which is understandable by anyone, to a text, the meaning of which is not understood by a third party (ciphertext), is encryption, the changing of ciphertext back into plaintext is decryption, and the overall process of this encryption and decryption is called a cryptosystem. In the encryption process and decryption process, secret data called an encryption key and a decryption key are utilized. Since a secret decryption key is required for decryption, only a person who knows this decryption key can decrypt a ciphertext, enabling the confidentiality of information to be maintained in accordance with encryption.

Encryption schemes can be broadly categorized into two types: common-key encryption schemes, and public-key encryption schemes. In a common-key encryption scheme, the encryption key and decryption key are identical, and encrypted communication is carried out in accordance with the sender and the receiver having the same key. A sender encrypts a plaintext on the basis of a secret common-key, and sends it to a receiver, and the receiver uses this common-key to decrypt the ciphertext into its original plaintext.

By contrast, in a public-key encryption scheme, the encryption key and decryption key are different, and encrypted, communication is performed such that a sender encrypts a plaintext with a receiver's public key, and the receiver decrypts this ciphertext using his own secret key. The public key is used for encryption, the secret key is a key for decrypting the ciphertext encrypted by the public key. The ciphertext encrypted by the public key can only be decrypted using a secret key.

With regard to product-sum cryptosystem, which is a public-key encryption scheme, new schemes and attack methods are being proposed one after another, and the development of an encryption/decryption technique, which is capable of highspeed decryption so as to enable lots of data to be processed in a short period of time, is especially desirable.

SUMMARY OF THE INVENTION

An object of the present invention is to provide a novel encryption method and decryption method, which are applicable to the product-sum cryptosystem and capable of highspeed decryption processing in accordance with multi-adic numbers.

According to the first aspect of the present invention, there is provided an encryption method which produces a ciphertext $C = m_0 B_0 + m_1 B_1 + \ldots + m_{K-1} B_{K-1}$ using a plaintext vector $m=(m_0, m_1, \ldots, m_{K-1})$, which divides a plaintext into K parts, and a base vector $B=(B_0, B_1, \ldots, B_{K-1})$, and is characterized in that the plaintext vector $B_i$ ($0 \leq i \leq K-1$) is set to $B_i = b_0 b_1 \ldots b_i$ using an integer $b_i$.

K may be a power of 2.

A random number vector $v=(v_0, v_1, \ldots, v_{K-1})$ may further be used to produce a ciphertext $C = m_0 v_0 B_0 + m_1 v_1 B_1 + \ldots + m_{K-1} v_{K-1} B_{K-1}$.

A plurality of groups of K terms of $b_i$ ($i=0, 1, \ldots, K-1$) may be provided, and a ciphertext may be produced for each of the groups.

According to the second aspect of the present invention, there is provided a decryption method for decrypting a ciphertext C, which has been encrypted by the above described encryption method, characterized in that plaintext vector $m=(m_0, m_1, \ldots, m_{K-1})$ is determined from ciphertext C according to the algorithm below.

Step 0

$$C_0 = C/b_0$$

$$m_0 \equiv C_0 \pmod{b_1}$$

Step i (i=1, 2, . . . , K−2)

$$C_i = (C_{i-1} - m_{i-1})/b_i$$

$$m_i \equiv C_i \pmod{b_{i+1}}$$

Step K−1

$$m_{K-1} = (C_{K-2} - m_{K-2})/b_{K-1}$$

According to the third aspect of the present invention, there is provided an encryption method for producing ciphertext $C = m_0 B_0 + m_1 B_1 + \ldots + m_{K-1} B_{K-1}$ using plaintext vector $m=(m_0, m_1, \ldots, m_{K-1})$, which divides a plaintext into K parts, and base vector $B=(B_0, B_1, \ldots, B_{K-1})$, characterized in that the above-mentioned $B_i$ ($0 \leq i \leq K-1$) is set to $B_i = v_i b_0 b_1 \ldots b_i$ using integer $b_i$, and random number $v_i$.

A plurality of groups of K terms of $b_i$ ($i=0, 1, \ldots, K-1$) may be provided, and a ciphertext may be produced for each of these groups.

According to the fourth aspect of the present invention, there is provided an encryption/decryption method which uses plaintext vector $m=(m_0, m_1, \ldots, m_{K-1})$ obtained by dividing a plaintext into K parts, and base vector $B=(B_0, B_1, \ldots, B_{K-1})$ to convert the plaintext to a ciphertext, and which further converts this ciphertext to the original plaintext, characterized in that this encryption/decryption method includes the step of setting the base vector $B_i$ ($0 \leq i \leq K-1$) to $B_i = b_0 b_1 \ldots b_i$ using integer $b_i$; the step of selecting w, which satisfies w<P (P: prime number), and determining public-key vector $c=(c_0, c_1, \ldots, c_{K-1})$ according to Formula (a);

$$c_i = wB_i \pmod{P} \tag{a}$$

the step of preparing ciphertext C shown in Formula (b) according to the scalar product of plaintext vector m and public-key vector c;

$$C = m_0 c_0 + m_1 c_1 + \ldots + m_{K-1} c_{K-1} \tag{b}$$

The step of determining an interim decrypted text M for ciphertext C as described in Formula (c);

$$M = w^{-1} C \pmod{P} \tag{c}$$

and the step of determining plaintext vector $m=(m_0, m_1, \ldots, m_{K-1})$ by decrypting this interim decrypted text M according to the algorithm below:

Step 0

$$M_0 = M/b_0$$

$$m_0 = M_0 \pmod{b_1}$$

Step i (i=1, 2, ..., K−2)

$$M_i = (M_{i-1} - m_{i-1})/b_i$$

$$m_i = M_i \pmod{b_{i+1}}$$

Step K−1

$$m_{K-1} = (M_{K-2} - m_{K-2})/b_{K-1}$$

According to the fifth aspect of the present invention, there is provided an encryption/decryption method which uses plaintext vector $m=(m_0, m_1, \ldots, m_{K-1})$ obtained by dividing a plaintext into K (K is a power of 2) parts, and base vector $B=(B_0, B_1, \ldots, B_{K-1})$ to convert the plaintext to a ciphertext, and which further converts the ciphertext to the original plaintext, characterized in that the method includes the step of setting the base vector $B_i$ ($0 \leq i \leq K-1$) to $B_i = b_0 b_1 \ldots b_i$ using integer $b_i$; the step of selecting w, which satisfies w<P (P: prime number), and determining public-key vector $c=(c_0, c_1, \ldots, c_{K-1})$ according to Formula (d);

$$c_i = wB_i \pmod{P} \tag{d}$$

the step of preparing ciphertext C shown in Formula (e) according to the scalar product of plaintext vector m and public-key vector c;

$$C = m_0 c_0 + m_1 c_1 + \ldots + m_{K-1} c_{K-1} \tag{e}$$

the step of determining an interim decrypted text M for ciphertext C as described in Formula (f);

$$M = w^{-1} C \pmod{P} \tag{f}$$

and the step of determining plaintext vector $m=(m_0, m_1, \ldots, m_{K-1})$ by decrypting this interim decrypted text M according to the algorithms below:

Two-part Algorithm:
First Step $$ML = M \pmod{B_{K/2}}$$

Second Step $$MR = (M - ML)/B_{K/2}$$

Highspeed Algorithm:

The two-part algorithm is applied once again to ML, MR. The two-part algorithm is once again applied to each of the four parts of the interim decrypted text. This kind of process is repeated.

According to the sixth aspect of the present invention, there is provided an encryption/decryption method, which uses plaintext vector $m=(m_0, m_1, \ldots, m_{K-1})$ obtained by dividing a plaintext into K parts, and base vector $B=(B_0, B_1, \ldots, B_{K-1})$ to convert the plaintext to a ciphertext, and which further converts the ciphertext to the original plaintext, characterized in that the method includes the step of setting the base vector $B_i$ ($0 \leq i \leq K-1$) according to Formula (g);

$$B_i = v_i b_0 b_1 \ldots b_i \tag{g}$$

Provided that $v_i$: random number $b_i$: integer $\gcd(v_i, b_{i+1}) = 1$ the step of selecting w, which satisfies w<P (P: prime number), and determining public-key vector $c=(c_0, c_1, \ldots, c_{K-1})$ according to Formula (h);

$$c_i = wB_i \pmod{P} \tag{h}$$

the step of preparing ciphertext C shown in Formula (i) according to the scalar product of plaintext vector m and public-key vector c;

$$C = m_0 c_0 + m_1 c_1 + \ldots + m_{K-1} c_{K-1} \tag{i}$$

the step of determining an interim decrypted text M for ciphertext C as described in Formula (j);

$$M = w^{-1} C \pmod{P} \tag{j}$$

and the step of determining plaintext vector $m=(m_0, m_1, \ldots, m_{K-1})$ by decrypting this interim decrypted text M according to the algorithm below:

Step 0

$$M_0 = C/b_0$$

$$m_0 = M_0 v_0^{-1} \pmod{b_1}$$

Step i (i=1, 2, ..., K−2)

$$M_i = (M_{i-1} - m_{i-1} v_{i-1})/b_i$$

$$m_i = M_i v_i^{-1} \pmod{b_{i+1}}$$

Step K−1

$$M_{K-1} = (M_{K-2} - m_{K-2} v_{K-2})/b_{K-1}$$

$$m_{K-1} = M_{K-1}/v_{K-1}$$

According to the seventh aspect of the present invention, there is provided an encryption/decryption method, which uses plaintext vector $m=(m_0, m_1, \ldots, m_{K-1})$, that divides a plaintext into K parts, and base vector $B=(B_0, B_1, \ldots, B_{K-1})$ to convert the plaintext to a ciphertext, and which further converts the ciphertext to the original plaintext, characterized in that the method includes the step of setting prime numbers P, Q; the step of setting first base vector $B_{Pi}$ ($0 \leq i \leq K-1$) to $B_{Pi} = b_{P0} b_{P1} \ldots b_{Pi}$ using integer $B_{Pi}$; the step of setting second base vector $B_{Qi}$ ($0 \leq i \leq K-1$) to $B_{Qi} = b_{Q0} b_{Q1} \ldots b_{Qi}$ using integer $b_{Qi}$; the step of using the Chinese Remainder Theorem to introduce a minimum integer $B_i$ so that the remainders resulting from P, Q constitute $B_{Pi}, B_{Qi}$, respectively; the step of selecting w, which satisfies w<N (N=PQ), and determining public-key vector $c=(c_0, c_1, \ldots, c_{K-1})$ according to Formula (k);

$$c_i = wB_i \pmod{N} \tag{k}$$

the step of preparing ciphertext C shown in Formula (1) according to the scalar product of plaintext vector m and public-key vector c;

$$C = m_0 c_0 + m_1 c_1 + \ldots m_{K-1} c_{K-1} \tag{1}$$

the step of determining interim decrypted texts $M_P$, $M_Q$ in modulus P, modulus Q for ciphertext C as described in Formula (m) and Formula (n);

$$M_P \equiv w^{-1}C \pmod{P} \tag{m}$$

$$M_Q \equiv w^{-1}C \pmod{Q} \tag{n}$$

and the step of determining plaintext vector $m=(m_0, m_1, \ldots, m_{K-1})$ by decrypting these interim decrypted texts $M_P$, $M_Q$ according to the algorithm below:

Step 0

$$M_{P0} = M_P / b_{P0}$$

$$M_{Q0} = M_Q / b_{Q0}$$

$$m_0^{(P)} \equiv M_{P0} \pmod{b_{P1}}$$

$$m_0^{(Q)} \equiv M_{Q0} \pmod{b_{Q1}}$$

Determines $m_0$ according to the Chinese Remainder Theorem.

Step i (i=1, 2, ..., K−2)

$$M_{Pi} = (M_{Pi-1} - m_{i-1}) / b_{Pi}$$

$$M_{Qi} = (M_{Qi-1} - m_{i-1}) / b_{Qi}$$

$$m_i^{(P)} \equiv M_{Pi} \pmod{b_{Pi+1}}$$

$$m_i^{(Q)} \equiv M_{Qi} \pmod{b_{Qi+1}}$$

Determines $m_1$ according to the Chinese Remainder Theorem.

Step K−1

$$m_{K-1} = (M_{PK-2} - m_{K-2}) / b_{PK-1}$$

or $$m_{K-1} = (M_{QK-2} - m_{K-2}) / b_{QK-1}$$

The ciphertext C may be sent having N as the modulus.

According to the eighth aspect of the present invention, there is provided a cryptographic communications system for carrying out data communications between a plurality of entities using ciphertext, characterized in that the system includes: an encryptor for preparing a ciphertext from a plaintext using any one of the above described encryption methods; a communications channel for sending the prepared ciphertext from one entity to another entity or entities; and a decryptor for decrypting the ciphertext as received to an original plaintext.

According to the ninth aspect of the present invention, there is provided an encryption method for producing a ciphertext from a plaintext, characterized in that the encryption method produces ciphertext $C = m_0 B_0 + m_1 B_1 + \ldots + m_{J-1} B_{J-1} + r_J B_J + r_{J+1} B_{J+1} + \ldots + r_{K-1} B_{K-1}$ by using plaintext vector $m = (m_0, m_1, \ldots, m_{J-1})$ that is obtained by dividing a plaintext to be encrypted into J parts, an arbitrary random number vector $r = (r_J, r_{J+1}, \ldots, r_{K-1})$, and a base vector $B = (B_0, B_1, \ldots, B_{K-1})$, that is set to $B_i = b_0 b_1 \ldots b_i$ using integer $b_i$ ($0 \leq i \leq K-1$).

According to the tenth aspect of the present invention, there is provided a decryption method for decrypting the ciphertext C encrypted according to the just described encryption method, characterized in that the decryption method determines plaintext vector $m = (m_0, m_1, \ldots, m_{J-1})$ from ciphertext C according to the algorithm below:

Step 0

$$C_0 = C / b_0$$

$$m_0 \equiv C_0 \pmod{b_1}$$

Step i (i=1, 2, ..., J−1)

$$C_i = (C_{i-1} - m_{i-1}) / b_i$$

$$m_i \equiv C_i \pmod{b_{i+1}}$$

According to the eleventh aspect of the present invention, there is provided an encryption method for producing a ciphertext from a plaintext, characterized in that the encryption method produces ciphertext $C = m_0 B_0 + m_1 B_1 + \ldots + m_{J-1} B_{J-1} + r_J B_J + r_{J+1} B_{J+1} + \ldots + r_{K-1} B_{K-1}$ by using plaintext vector $m = (m_0, m_1, \ldots, m_{J-1})$, that divides a plaintext to be encrypted into J parts, an arbitrary random number vector $r = (r_J, r_{J+1}, \ldots, r_{K-1})$, and a base vector $B = (B_0, B_1, \ldots, B_{K-1})$, that is set to $B_i = v_1 b_0 b_1 \ldots b_i$ using integer $b_i$ and random number $v_i$ ($0 \leq i \leq K-1$).

An outline of the encryption method and decryption method of the present invention is now described hereinbelow. In the present invention, multi-adic numbers is utilized.

A message $m = (m_0, m_1, \ldots, m_{K-1})$ can be expressed as an integer, as shown in Formula (1) below, by using base $B = (B_0, B_1, \ldots, B_{K-1})$. Here it should be assumed that $m_i B_i < B_{i+1}$ is satisfied.

$$M = m_0 B_0 + m_1 B_1 + \ldots + m_{K-1} B_{K-1} \tag{1}$$

In Formula (1), when $B_i = 2^i$, a message is expressed as an ordinary binary number, and when $B_i = 10^i$, a message is expressed as an ordinary decimal number.

Here, a case where Bi is set as in Formula (2) below will be considered.

$$B_i = b_0 b_1 \ldots b_i \tag{2}$$

In Formula (2), setting $b_0 = 1$, $b_i = 2$ ($1 \leq i \leq K-1$) accords with the case of a binary number, and setting $b_0 = 1$, $b_i = 10$ ($1 \leq i \leq K-1$) accords with the case of a decimal number.

In the present invention, a ciphertext is prepared by using such multi-adic numbers, that is, by utilizing Formula (1) and Formula (2).

When the base is designated using Formula (2), the message $m = (m_0, m_1, \ldots, m_{K-1})$ can be decrypted from integer M according to the algorithm shown below. This decryption algorithm is called sequential decryption algorithm I.

Sequential Decryption Algorithm I:

Step 0

$$M_0 = M / b_0$$

$$m_0 \equiv M_0 \pmod{b_1}$$

Step i (i=1, 2, ..., K−2)

$$M_i = (M_{i-1} - m_{i-1}) / b_i$$

$$m_i \equiv M_i \pmod{b_{i+1}}$$

Step K–1

$$m_{K-1} = (M_{K-2} - m_{K-2})/b_{K-1}$$

In this algorithm, if $m_j < B_{j+1}$ is not established, then $m_j$ is not uniquely decrypted.

An encryption technique according to such multi-adic numbers, and a decryption method therefor are characteristic of the present invention. Specific techniques will be described later.

Further, in the present invention, the plaintext is made to have redundancy. Specifically, ciphertext is constituted by scalar product of a plaintext vector, which divides into parts an original plaintext to be encrypted, and a random number vector and/or a base vector, which do not particularly need to be encrypted. Accordingly, density can be set at 1 or more, and an extremely large number of decryption methods exist for 1 ciphertext, making attacks according to the Lenstra-Lenstra-Lovasz (LLL) algorithm extremely difficult. This results in improved safety.

DETAILED DESCRIPTION OF THE INVENTION

Embodiments of the present invention will be described in detail hereinbelow.

Figure 1:
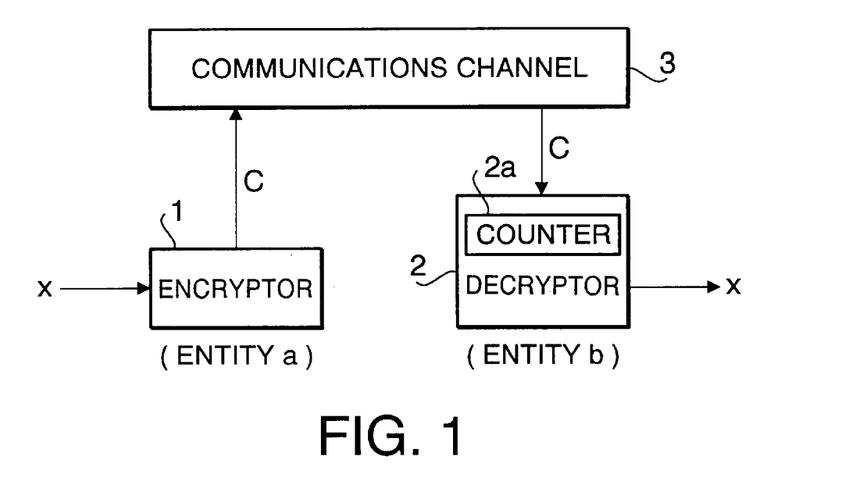
FIG. 1 is a schematic diagram showing data communications between 2 entities.

Referring to FIG. 1, illustrated is a schematic diagram showing data communications between entities a, b, wherein an encryption method and decryption method according to the present invention are utilized. The example of FIG. 1 shows a case, in which one entity a uses an encryptor 1 to encrypt a plaintext x into a ciphertext C, and sends this ciphertext C via a communications channel 3 to another entity b, and entity b uses a decryptor 2 to decrypt this ciphertext C into the original plaintext x. A counter 2a, which is utilized in the below-described decryption process, is built into the decryptor 2.

First Embodiment:

A secret key and a public key are prepared as shown below.

Secret key: $\{b_i\}$, P, w

Public key: $\{c_i\}$

A base is designated as in Formula (2), integer w, which satisfies $w<P$ (where P is a large prime number), is randomly selected, and Formula (3) is introduced.

$$c_i = wB_i \pmod{P} \tag{3}$$

A public-key vector c is designated as in Formula (4):

$$c = (c_0, c_1, \ldots, c_{K-1}) \tag{4}$$

Further, $\mu$, which satisfies $\mu < \min(b_1, \ldots, b_{K-1})$, is released to each entity. On the entity a side, a plaintext x is divided on the basis of this released $\mu$ into K-dimensional message vectors less than or equal to $\mu$. When the number of bits of a message are restricted like this, the size relationship of $b_0, b_1, \ldots, b_{K-1}$ can be arbitrarily set. Then, the scalar product of the message vector m and the public-key vector c is determined as in Formula (5), so that a ciphertext C is produced. This is encryption of the plaintext x. The prepared ciphertext C is sent from entity a to entity b via the communications channel 3.

$$C = m_0 c_0 + m_1 c_1 + \ldots + m_{K-1} c_{K-1} \tag{5}$$

This encryption can be performed in the time required for 1 (one) multiplication operation according to a parallel process of a K multiple, and an addition process of $\log_2 K$ times.

On the entity b side, decryption processing is performed as follows.

An interim decrypted text M is determined for ciphertext C as in Formula (6).

$$M \equiv w^{-1}C \pmod{P} \tag{6}$$

Because this interim decrypted text M is designated specifically as in Formula (7), decryption can be performed according to the above-mentioned sequential decryption algorithm I.

$$M = m_0 b_0 + m_1 b_0 b_1 + \ldots + m_{K-1} b_0 b_1 \ldots b_{K-1} \tag{7}$$

Figure 2:
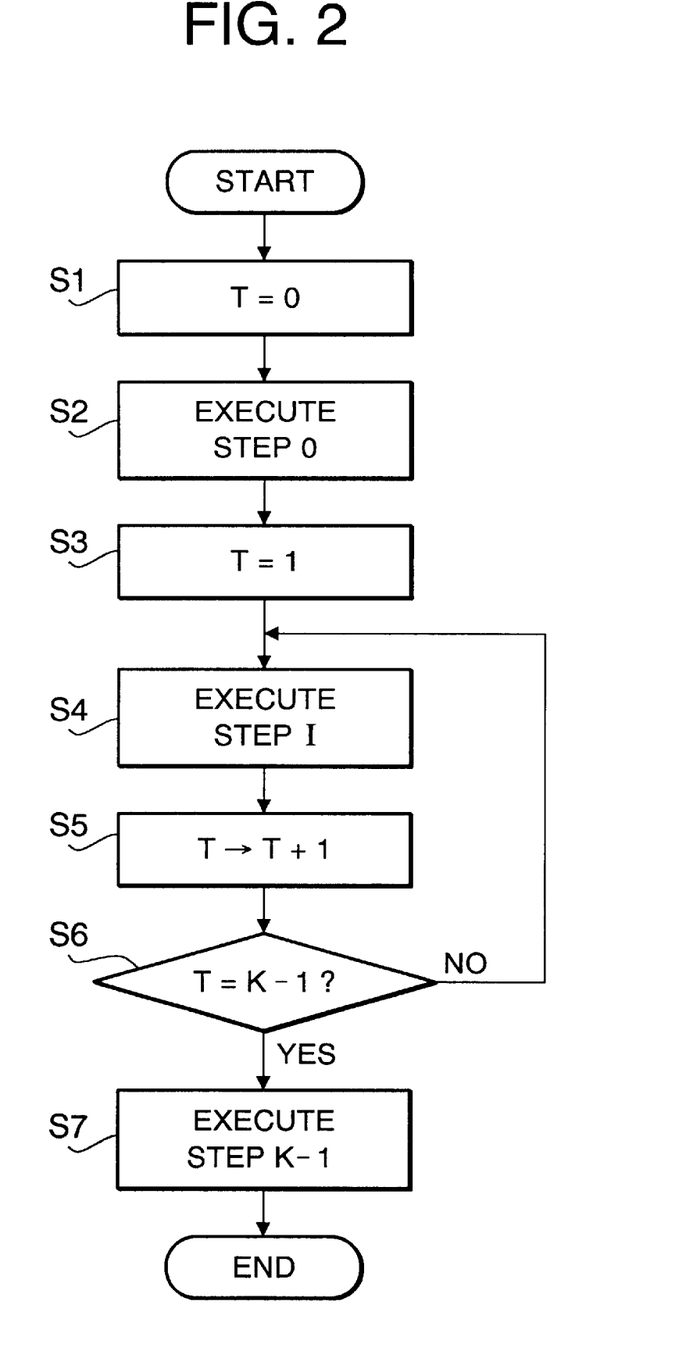
FIG. 2 is a flowchart showing a decryption procedure of the present invention.

Referring to FIG. 2, illustrated is a flowchart showing the processing procedure of this sequential decryption algorithm I, which is carried out by the decryptor 2. First, the counter 2a is reset, and the count value T thereof is set to 0 (S1). Then, after executing the operation of Step 0 to determine $m_0$ (S2), the count value T is set to 1 (S3). Next, Step i is executed to determine $m_i$ (S4), and the count value T is incremented by 1 (S5). Subsequently, a decision is made as to whether or not the count value T has reached K-1 (S6), and when it has not reached K-1 (S6: NO), the S4, S5 processes are repeated. Repeating this process from T=1 to T=K-2 determines $m_1$ through $m_{K-2}$. When the count value T has reached K-1 (S6: YES), Step K-1 is executed to determine $m_{K-1}$ (S7).

In this first embodiment, when $b_i$ is a simple form such as $b_i = p^d$, Formula (8), Formula (9) below are established so that Formula (10) is realized and P is revealed.

$$wb_0 b_1 \ldots b_J/wb_0 b_1 \ldots b_{J-1} \equiv B_J/B_{J-1} \pmod{P} \tag{8}$$

$$wb_0 b_1 \ldots b_{J+1}/wb_0 b_1 \ldots b_J \equiv B_{J+1}/B_J \pmod{P} \tag{9}$$

$$(B_J)^2 - B_{J-1} B_J = Ng \tag{10}$$

Conversely, when $b_i$ is randomly selected in the vicinity of $p^d$, by postulating in a round-robin fashion the value of one $b_i$, P is likewise revealed. $b_i$ should be 64 bits or more.

This first embodiment can also be ranked as a technique, which generalizes a 0, 1 knapsack cipher. That is, if $m_i \in GF(2)$, the first embodiment is in accord with a 0,1 knapsack cipher according to a superincreasing sequence $\{b_0, b_0 b_1, \ldots, b_0 b_1 \ldots b_{K-1}\}$.

In general, with a conventional product-sum cryptosystem, that uses a superincreasing sequence, it was necessary to perform sequential decryption from the high-order position of a plaintext because there is no mutual relationship between bases, and therefore it was necessary to perform division, having multiple-length integers as divisors. However, in the system of the present invention, which uses this bi notation, highspeed decryption is possible because division and remainder operations are repeated, with a small integer from the low-order position as a modulus.

A decryption technique that attempts to further increase the speed of decryption will be described hereinbelow.

The front-half portion of an interim decrypted text M is designated ML, and the quotient of dividing the latter-half portion of an interim decrypted text M by $B_{K/2}$ is designated MR. These ML and MR are shown in detail in Formula (11) and Formula (12). Here, K is a power of 2.

$$ML = m_0 B_0 + \ldots + m_{K/2-1} B_{K/2-1} \quad (11)$$

$$MR = (m_{K/2} B_{K/2} + \ldots + m_{K-1} B_{K-1})/B_{K/2} \quad (12)$$

A two-part algorithm such as this, and a highspeed algorithm, which repeatedly applies same are shown below.

Two-part Algorithm:
First Step $$ML \equiv M \pmod{B_{K/2}}$$

Second Step $$MR = (M - ML)/B_{K/2}$$

Highspeed Algorithm:

The two-part algorithm is applied to ML, MR once again. The two-part algorithm is once again applied to each of the four parts of the message. This kind of process is repeated.

By so doing, when K is a power of 2, it is possible to achieve especially highspeed decryption processing. When this highspeed algorithm is applied, decryption can be speeded up by $K/\log_2 K$ times compared to the above-mentioned sequential decryption algorithm.

For example, when $b_i$ is some 64-bit prime number, and K=64, the size of the ciphertext C becomes 4166 bits, but because decryption time in accordance with the highspeed algorithm is $64=2^6$, it is practically the same as decryption time in accordance with the sequential decryption algorithm when K=6. That is, decryption processing can be carried approximately 10 times faster. In this case, the size of the public key is a rather large 1 kilobit, but when consideration is given to a situation, in which high-density recording (storage) of 1 gigabit/cm² is possible, the size of this public key can be said not to be a problem from a practical standpoint.

Second Embodiment:

A second embodiment, which additionally employs a random number to the first embodiment, will be described.

In the first embodiment, $\{B_i\}$ constitutes a superincreasing sequence. Therefore, the first embodiment could be susceptible to an attack according to the LLL algorithm, which is famous as an attack algorithm that targets a superincreasing sequence. Accordingly, in the second embodiment, a random number is added to the base, that is, security is reinforced by mating a random number to the base vector in the first embodiment, and utilizing the resulting vector as the base vector.

A secret key and a public key are prepared as below.
Secret key: $\{b_i\}$, $\{v_i\}$, P, w
Public key: $\{c_i\}$ The base $B_i$ is designated as in Formula (13).

$$B_i = v_i b_0 b_1 \ldots b_i \quad (13)$$

Here, $v_i$ is determined in such a manner that each $B_i$ shown in Formula (13) will have practically the same size. Therefore, $\{B_i\}$ is not a superincreasing sequence, and is not susceptible to an LLL algorithm attack. It should be noted that $\gcd(v_i, b_{i+1}) = 1$ must be satisfied here.

Using integer w, the public-key vector c is determined in the same manner as the first embodiment from Formula (14), Formula (15) below.

$$c_i = w B_i \pmod P \quad (14)$$

$$c = (c_0, c_1, \ldots c_{K-1}) \quad (15)$$

A ciphertext C is then produced according to the scalar product of message vector m and public-key vector c, the same as in the first embodiment (Formula (5)).

Decryption processing is performed as described below.

An interim decrypted text M is determined for the ciphertext C as in Formula (16).

$$M \equiv w^{-1} C \pmod P \quad (16)$$

Because this interim decrypted text M is specifically given by Formula (17), decryption can be performed according to sequential decryption algorithm II shown below.

$$M = m_0 v_0 b_0 + m_1 v_1 b_0 b_1 + \ldots + m_{K-1} v_{K-1} b_0 b_1 \ldots b_{K-1} \quad (17)$$

Sequential Decryption Algorithm II:
Step 0

$$M_0 = M/b_0$$

$$m_0 \equiv M_0 v_0^{-1} \pmod{b_1}$$

Step i (i=1, 2, ..., K−2)

$$M_i = (M_{i-1} - m_{i-1} v_{i-1})/b_i$$

$$m_i \equiv M_i v_i^{-1} \pmod{b_{i+1}}$$

Step K−1

$$M_{K-1} = (M_{K-2} - m_{K-2} v_{K-2})/b_{K-1}$$

$$m_{K-1} = M_{K-1}/v_{K-1}$$

The flowchart for executing this sequential decryption algorithm II via the decryptor 2 is the same as the flowchart of sequential decryption algorithm I (FIG. 2).

Here, a specific example of the second embodiment will be shown.
Secret key
b=(1, 11, 13)
v=(1009, 131, 7)
B=(1009, 1441, 1001)
P=27481
w=739
$w^{-1} \equiv 702 \pmod P$
(Since $b_1 < b_2 < b_3$, setting $v_1 > v_2 > v_3$ prevents $B_1$, $B_2$, $B_3$ from becoming a superincreasing sequence.)
Public key $$c = wB \equiv (3664, 20621, 25233) \pmod P$$

Encryption
Makes message m=(6, 7, 8)

$$C = c \cdot m = 6 \times 3664 + 7 \times 20621 + 8 \times 25233 = 368195$$

Decryption

An interim decrypted text M is determined, and decryption is performed using sequential decryption algorithm II.

$$M \equiv w^{-1} C \equiv 702 \times 368195 \equiv 24149 \pmod{27481}$$

Step 0

$$M_0 = 24149/1 = 24149$$

$$m_0 \equiv 24149 \times 1009^{-1} \equiv 6 \pmod{11}$$

Step 1

$$M_1=(24149-6\times1009)/11=1645$$

$$m_1\equiv1645\times131^{-1}\equiv7 \text{ (mod 13)}$$

Step 2

$$M_2=(1645-7\times131)/13=56$$

$$m_2\equiv56/7=8$$

Doing as set forth above produces message m=(6, 7, 8).

Third Embodiment:

In the second embodiment, a random number is incorporated into the base vector itself, but it is also possible to use the same base vector as that in the first embodiment, and to add random number $v_0, v_1, \ldots, v_{K-1}$ at the ciphertext C preparation stage. In this case, the ciphertext C constitutes the same form as that of the second embodiment.

Fourth Embodiment:

A fourth embodiment, which multiplexes the base vector in the first embodiment, will be described. The fourth embodiment relates to an encryption/decryption method, which prepares a base vector $\{B_i\}$ of the first for each of 2 moduli, and uses the Chinese Remainder Theorem. In this fourth embodiment as well, the base vector $\{B_i\}$ does not constitute a superincreasing sequence, and is strong against LLL algorithm attacks. Further, the size of a plaintext can be increased.

The secret key and public key are prepared as below.

Secret key: $\{B_{Pi}\}, \{b_{Qi}\}$, P, Q, N, w
Public key: $\{c_i\}$

Two large prime numbers P, Q are selected, and the product thereof is treated as N. A pair of K terms of bi (i=0, 1, ..., K−1) in the first embodiment are prepared, and treated as $\{B_{Pi}\}, \{b_{Qi}\}$, respectively. Further, the bases generated according thereto are treated as $\{B_{Pi}\}, \{B_{Qi}\}$, respectively. The Chinese Remainder Theorem is utilized to introduce a minimum integer $B_i$ under the condition that remainders according to P, Q constitute $B_{Pi}, B_{Qi}$, respectively.

Having N as the modulus, and using a secret integer w, the public-key vector c is determined in accordance with the following Formula (18) and Formula (19) the same as in the first embodiment.

$$c_i\equiv wB_i \text{ (mod } N\text{)} \tag{18}$$

$$c=(c_0, c_1, \ldots, c_{K-1}) \tag{19}$$

A ciphertext C is produced according to the scalar product of message vector m and public-key vector c, the same as in the first embodiment (Formula (5)).

Decryption processing is performed as described below.

Interim decrypted texts $M_P, M_Q$ are determined for ciphertext C with moduli P, Q, respectively, as in Formulas (20), (21).

$$M_P\equiv w^{-1}C \text{ (mod } P\text{)} \tag{20}$$

$$M_Q\equiv w^{-1}C \text{ (mod } Q\text{)} \tag{21}$$

Formulas (22) and (23) are established relative to the interim decrypted texts $M_P, M_Q$, respectively.

$$M_P=m_0B_{P0}+m_1B_{P1}+\ldots+m_{K-1}B_{PK-1} \tag{22}$$

$$M_Q=m_0B_{Q0}+m_1B_{Q1}+\ldots+m_{K-1}B_{QK-1} \tag{23}$$

Applying sequential decryption algorithm III shown below to $M_P, M_Q$ enables a pair of remainders ($m_i^{(P)}$, $m_i^{(Q)}$) to be introduced. Here, $m_i$ is given by either one of Formulas (24), (25).

$$m_i\equiv m_i^{(P)} \text{ (mod } b_{Pi+1}\text{)} \tag{24}$$

$$m_i\equiv m_i^{(Q)} \text{ (mod } b_{Qi+1}\text{)} \tag{25}$$

Applying the Chinese Remainder Theorem thereto makes it possible to decrypt message $m_i<$1cm ($b_{Pi+1}, b_{Qi+1}$).

Sequential Decryption Algorithm III:

Step 0

$$M_{P0}=M_P/b_{P0}$$

$$M_{Q0}=M_Q/b_{Q0}$$

$$m_0^{(P)}\equiv M_{P0} \text{ (mod } b_{P1}\text{)}$$

$$m_0^{(Q)}\equiv M_{Q0} \text{ (mod } b_{Q1}\text{)}$$

$m_0$ is determined according to the Chinese Remainder Theorem.

Step i (i=1, 2, ..., K−2)

$$M_{Pi}=(M_{Pi-1}-m_{i-1})/b_{Pi}$$

$$M_{Qi}=(M_{Qi-1}-m_{i-1})/b_{Qi}$$

$$m_i^{(P)}\equiv M_{Pi} \text{ (mod } b_{Pi+1}\text{)}$$

$$m_i^{(Q)}\equiv M_{Qi} \text{ (mod } b_{Qi+1}\text{)}$$

$m_i$ is determined according to the Chinese Remainder Theorem.

Step K−1

$$m_{K-1}=(M_{PK-2}-m_{K-2})/b_{PK-1}$$

or $$m_{K-1}=(M_{QK-2}-m_{K-2})/b_{QK-1}$$

Here, a specific example of the fourth embodiment will be shown.

Secret key $b_P$=(1, 11, 19)

$b_Q$=(1, 13, 17)

$B_P$=(1, 11, 209)

$B_Q$=(1, 13, 221)

B=(1, 326859526, 1961157299)

P=45053

Q=54833

N=2470391149 w=320718294

$w^{-1}\equiv$1798315174 (mod N)

Although $B_P, B_Q$ appear to be superincreasable, B is not a superincreasing sequence.)

Public key $$c=wB\equiv(320718294, 1521781250, 644798264) \text{ (mod } N\text{)}$$

Encryption

Makes message m=(45, 67, 89)

$$C=c\cdot m=173778712476$$

The number of bits into which a message is divided can be improved to equal to or less than 11×13.

Decryption Interim decrypted texts $M_P, M_Q$ are determined, and decryption is performed using sequential decryption algorithm III.

$$M_P\equiv w^{-1}C\equiv19383 \text{ (mod 45053)}$$

$$M_Q\equiv w^{-1}C\equiv20585 \text{ (mod 54833)}$$

Step 0

$$M_{P0}=19383/1=19383$$

$$M_{Q0}=20585/1=20585$$

$$m_{P0}\equiv 19383\equiv 1 \pmod{11}$$

$$m_{Q0}\equiv 20585\equiv 6 \pmod{13}$$

$$m_0\equiv 45 \pmod{143}$$

Step 1

$$M_{P1}=(19383-45)/11=1758$$

$$M_{Q1}=(20585-45)/13=1580$$

$$m_{P1}\equiv 1758\equiv 10 \pmod{19}$$

$$m_{Q1}\equiv 1580\equiv 16 \pmod{17}$$

$$m_1\equiv 67 \pmod{323}$$

Step 2

$$m_{P2}=(1758-67)/19=89$$

$$m_{Q2}=(1580-67)/17=89$$

$$m_2=89$$

Doing as set forth above produces message m=(45, 67, 89).

When the factorization of N is difficult in a multiplexed scheme like the fourth embodiment, in which a composite number N is treated as the modulus, this scheme can be considered secure even if N is made public. Therefore, in a case such as this, sending a ciphertext C determined having N as a modulus enhances encryption efficiency.

Fifth Embodiment:

A fifth embodiment relates to an encryption scheme, which adds a random number to the fourth embodiment, in other words, it is an encryption scheme, which multiplexes the base vector in the second embodiment. Because this fifth embodiment can be readily understood by referring to the first through fourth embodiments described above, a detailed description will be omitted.

Sixth Embodiment:

A secret key and a public key are prepared as shown below.

Secret key: $\{b_i\}$, P, w ($0\leq i \leq K-1$)
Public key: $\{c_i\}$, $\{e_i\}$ Using the above-mentioned secret key $\{b_i\}$, a base vector $B=(B_0, B_1, \ldots, B_{K-1})$ is set as in the below Formula (26).

$$B_i = b_0 b_1 \ldots b_i \tag{26}$$

In Formula (26), when $b_0=1$, $b_i=2$ ($0\leq i<K-1$), the base vector B accords with binary numbers, and when $b_0=1$, $b_i=10$ ($0\leq i\leq K-1$), the base vector B accords with decimal numbers.

A base is designated in this manner, integer w, which satisfies w<P (where P is a large prime number), is randomly selected, and Formula (27) is introduced.

$$c_i \equiv wB_i \pmod{P} \tag{27}$$

Public key vector c is designated as in Formula (28).

$$c=(c_0, c_1, \ldots, c_{K-1}) \tag{28}$$

On the entity a side, a plaintext vector $m=(m_0, m_1, \ldots m_{J-1})$ is produced based on the public $\{e_i\}$ by dividing into J parts a plaintext x which is to be encrypted and sent to entity b in a vector of a size smaller than the public key $\{e_i\}$. Further, a random number vector $r=(r_J, r_{J+1}, \ldots, r_{K-1})$, which does not necessarily have to be sent to entity b, is produced. For example, this random number vector r is produced by dividing into (K-J) parts a plaintext (redundant text), which does not necessarily have to be sent to entity b. Linking together this plaintext vector m and random number vector r produces a message vector $m'=(m_0, m_1, \ldots, m_{J-1}, r_J, r_{J+1}, \ldots, r_{K-1})$, having K number of components.

This message vector $m'=(m_0, m_1, \ldots, m_{J-1}, r_J, r_{J+1}, \ldots, r_{K-1})$, can be expressed as an integer using base vector $B=(B_0, B_1, \ldots, B_{K-1})$ as shown in Formula (29) below.

$$M=m_0B_0+m_1B_1+\ldots+m_{J-1}B_{J-1}+r_JB_J+r_{J+1}B_{J+1}+\ldots+r_{K-1}B_{K-1} \tag{29}$$

In Formula (29), when $B_i=2^i$, the message is expressed as an ordinary binary number, and when $B_i=10^i$, the message is expressed as an ordinary decimal number.

Then, a ciphertext C is produced by determining the scalar product of the message vector m' and the public-key vector c to encrypt the message vector m' (plaintext vector m+random number vector r) as in Formula (30) below. The prepared ciphertext C is sent from the entity a to the entity b via the communications channel 3.

$$C=m_0c_0+m_1c_1+\ldots+m_{J-1}c_{J-1}+r_Jc_J+r_{J+1}c_{J+1}+\ldots+r_{K-1}c_{K-1} \tag{30}$$

This encryption can be performed in the time required for 1 multiplication operation according to a parallel process of a K multiple, and an addition process of $\log_2 K$ times.

On the entity b side, decryption processing is performed as follows.

An interim decrypted text M is determined for ciphertext C as in Formula (31).

$$M \equiv w^{-1}C \pmod{P} \tag{31}$$

Because this interim decrypted text M is designated specifically as Formula (32), decryption can be performed according to the sequential decryption algorithm I shown below.

$$M=m_0b_0+m_1b_0b_1+\ldots+m_{J-1}b_0b_1\ldots b_{J-1}+r_Jb_0b_1\ldots b_J+r_{J+1}b_0b_1\ldots b_{J+1}+\ldots+r_{K-1}b_0b_1\ldots b_{K-1} \tag{32}$$

Sequential Decryption Algorithm IV:

A plaintext vector $m=(m_0, m_1, \ldots, m_{J-1})$ is decrypted from integer M in the following process. Because the random number vector $r=(r_J, r_{J+1}, \ldots, r_{K-1})$ is a component that does not necessarily have to be sent, it is rejected.

Step 0

$$M_0 = M/b_0$$

$$m_0 \equiv M_0 \pmod{b_1}$$

Step i (i=1, 2, ..., J-1)

$$M_i = (M_{i-1} - m_{i-1})/b_i$$

$$m_i \equiv M_i \pmod{b_{i+1}}$$

In this algorithm, if $m_j<b_{j+1}$ is not satisfied, then $m_j$ is not decrypted uniquely.

Figure 3:
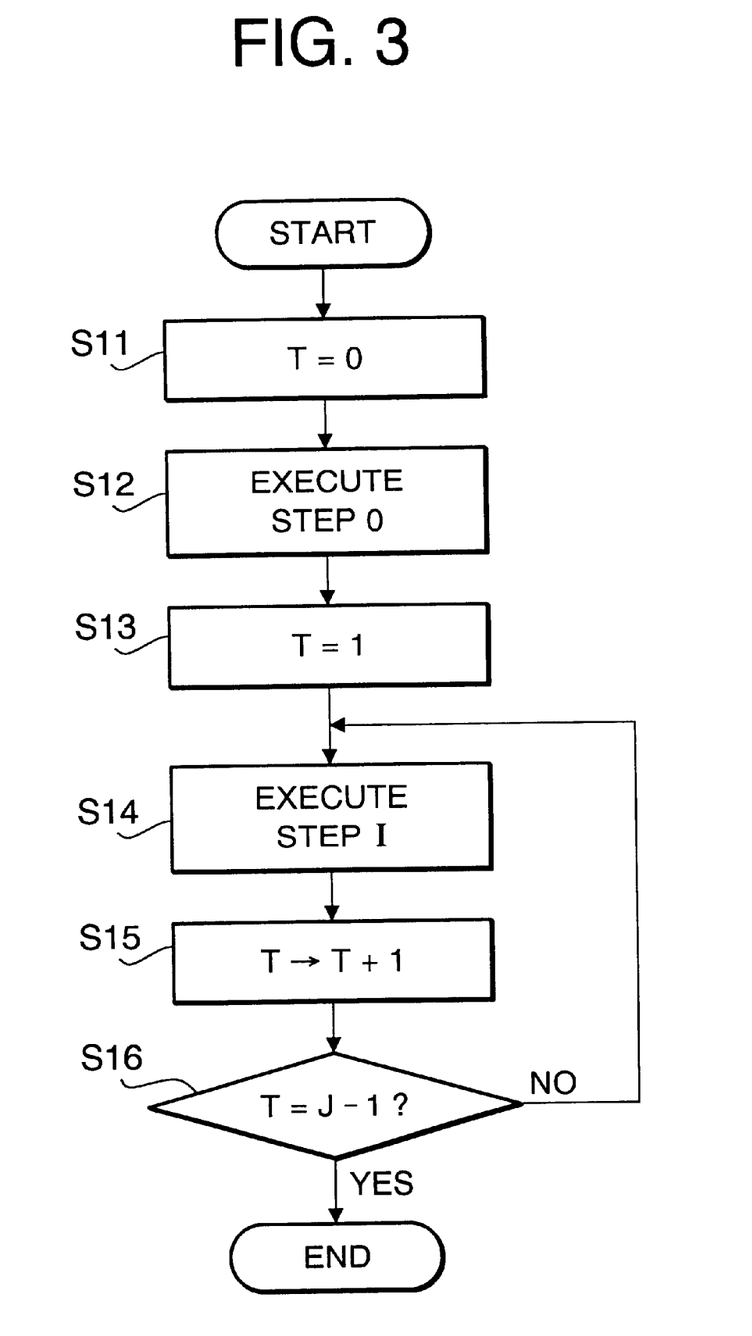
FIG. 3 illustrates a flowchart for another decryption procedure according to the present invention.

FIG. 3 is a flowchart showing the procedure of this sequential decryption algorithm IV, which is carried out by the decryptor 2. First, the counter 2a is reset, and the count value T thereof is set to 0 (S11). Then, after executing the operation of Step 0 to determine $m_0$ (S12), the count value T is set to 1 (S13). Next, Step i is executed to determine $m_i$ (S14), and the count value T is incremented by 1 (S15). A decision is then made as to whether or not the count value T has reached (J−1) (S16), and when it has not reached [J−1] (S16: NO), the S14, S15 processes are repeated. Repeating this process from T=1 to T=J−1 determines $m_1$ through $m_{J-1}$. When the count value T has reached (J−1) (S16: YES), processing ends.

Next, the security of an encryption/decryption method such as this will be examined. Furnishing redundancy (random number vector r) to the message M, which is indicated by the message vector m', establishes Formula (33) below. R represents the redundancy component indicated by the random number vector r.

$$\log_2 M = \log_2 x + \log_2 R \tag{33}$$

Here, the data rate s of message M is defined as in Formula (34) below, and the density ρ of same is defined as in Formula (35) below. In the system of the present invention, the data rate s only diminishes by the extent of the redundancy furnished, but since the density ρ increases, it is strong against the LLL algorithm.

$$s = \log_2 x / \log_2 M \tag{34}$$

$$\rho = \log_2 M / \log_2 C \tag{35}$$

Further, in an attempt to simplify the description, each parameter is set as below.

$e_i = e \in Z$ (constant)
$b_0 = 1$
$b_i = 2^e + \delta_i$ (i=1, ..., J)
$b_i = 2^{0.5e} + \delta_i$ (i=J+1, ..., K−1)
(Provided that $\delta_i \ll 2^e$)
$|m_i| = e$
$|C| = Ke + \log_2 K$
$J = K − 3$ Therefore, the message vector m'=$(m_0, m_1, \ldots, m_{J-1}, r_J, r_{J+1}, \ldots, r_{K-1})$ is constituted as in Formula (36) below.

$$m' = (m_0, m_1, \ldots, m_{K-4}, r_{K-3}, r_{K-2}, r_{K-1}) \tag{36}$$

According to the parameter setting as described above, the data rate s, and density ρ respectively, are designated by Formulas (37), (38). Therefore, it Is learned that ρ≈1 when $\log_2 K \ll Ke$.

$$s \approx (K-3)/K \tag{37}$$

$$\rho \approx Ke/(Ke + \log_2 K) \tag{38}$$

With regard to data rate s and density ρ, Formulas (39), (40) below are established for an ordinary J.

$$s \approx J/K \tag{39}$$

$$\rho \approx Ke/\{(J+K+1)e/2 + \log_2 K\} \tag{40}$$

In Formulas (39), (40), when J=K/2, it becomes s≈1/2, ρ≈4/3>1. When the base $b_{K-2} = b_{K-1} = 2^{0.5e}$ is used, at J=K−3, the message M can be decrypted using any one of $2^e$ different decryption methods. This $2^e$ value can be considered the lower bound for an ordinary base. For example, when e=64, for the same message M, an attack according to the LLL algorithm will not succeed because there are decryption methods in $2^e = 2^{64} \approx 1.6 \times 10^{19}$ ways.

Seventh Embodiment:

A seventh embodiment, which adds a random number to the sixth embodiment, will be described. In the seventh embodiment, a random number is added to the base, that is, security is reinforced by mating a random number to the base vector in the sixth embodiment, and utilizing the resulting vector as the base vector.

A secret key and a public key are prepared as below.
Secret key: $\{b_i\}$, $\{v_i\}$, P, w
Public key: $\{c_i\}$, $\{e_i\}$ The base $B_i$ is designated as in Formula (41).

$$B_i = v_i b_0 b_1 \ldots b_i \tag{41}$$

Here, $v_i$ is set in a manner such that each $B_i$ shown in Formula (41) will constitute practically the same size. It should be noted that gcd $(v_i, b_{i+1})=1$ must be satisfied here.

Using integer w, public-key vector c is determined as in Formula (42), Formula (43) below, the same as in the sixth embodiment.

$$c_i = wB_i \pmod{P} \tag{42}$$

$$c = (c_0, c_1, \ldots, c_{K-1}) \tag{43}$$

A ciphertext C is produced according to the scalar product of message vector m' and public-key vector c, the same as in the sixth embodiment (Formula (30)).

Decryption processing is performed as described hereinbelow.

An interim decrypted text M is determined for the ciphertext C as in Formula (44).

$$M \equiv w^{-1} C \pmod{P} \tag{44}$$

Because this interim decrypted text M is designated specifically as in Formula (45), decryption can be performed according to sequential decryption algorithm II shown below. The random number vector r=$(r_J, r_{J+1}, \ldots, r_{K-1})$ is rejected the same as in the sixth embodiment.

$$\begin{aligned} M &= m_0 v_0 b_0 + m_1 v_1 \\ & b_0 b_1 + \ldots + m_{J-1} v_{J-} \\ & 1 b_0 b_1 \ldots b_{J-1} + r_J \\ & v_J b_0 b_1 \ldots b_J + r_{J+} \\ & 1 v_{J+1} b_0 b_1 \ldots b_{J+1} r_{+1} \\ & + \ldots + r_{K-1} v_{K-1} b_0 \\ & b_1 \ldots b_{K-1} \end{aligned} \tag{45}$$

Sequential Decryption Algorithm V:
Step 0

$M_0 = M/b_0$ $m_0 \equiv M_0 v_0^{-1} \pmod{b_1}$

Step i (i=1, 2, ..., J−1)

$M_i = (M_{i-1} - m_{i-1} v_{i-1})/b_i$ $m_i \equiv M_i v_i^{-1} \pmod{b_{i+1}}$ The flowchart for executing this sequential decryption algorithm V via the decryptor 2 is the same as the flowchart of sequential decryption algorithm IV (FIG. 3).

Since a ciphertext is prepared using the plaintext vector m to be sent, a base vector B, and a random number vector r, which does not especially have to be sent, similar to the sixth embodiment, the seventh embodiment is also not susceptible to LLL algorithm attacks.

In the seventh embodiment, a random number is incorporated into the base vector itself, but it is also possible to use the same base vector as that in the sixth embodiment, and to add random number $v_0, v_1, \ldots, v_{K-1}$ at the ciphertext C preparation stage. In this case, the ciphertext C constitutes the same form as that of the seventh embodiment.

Figure 4:
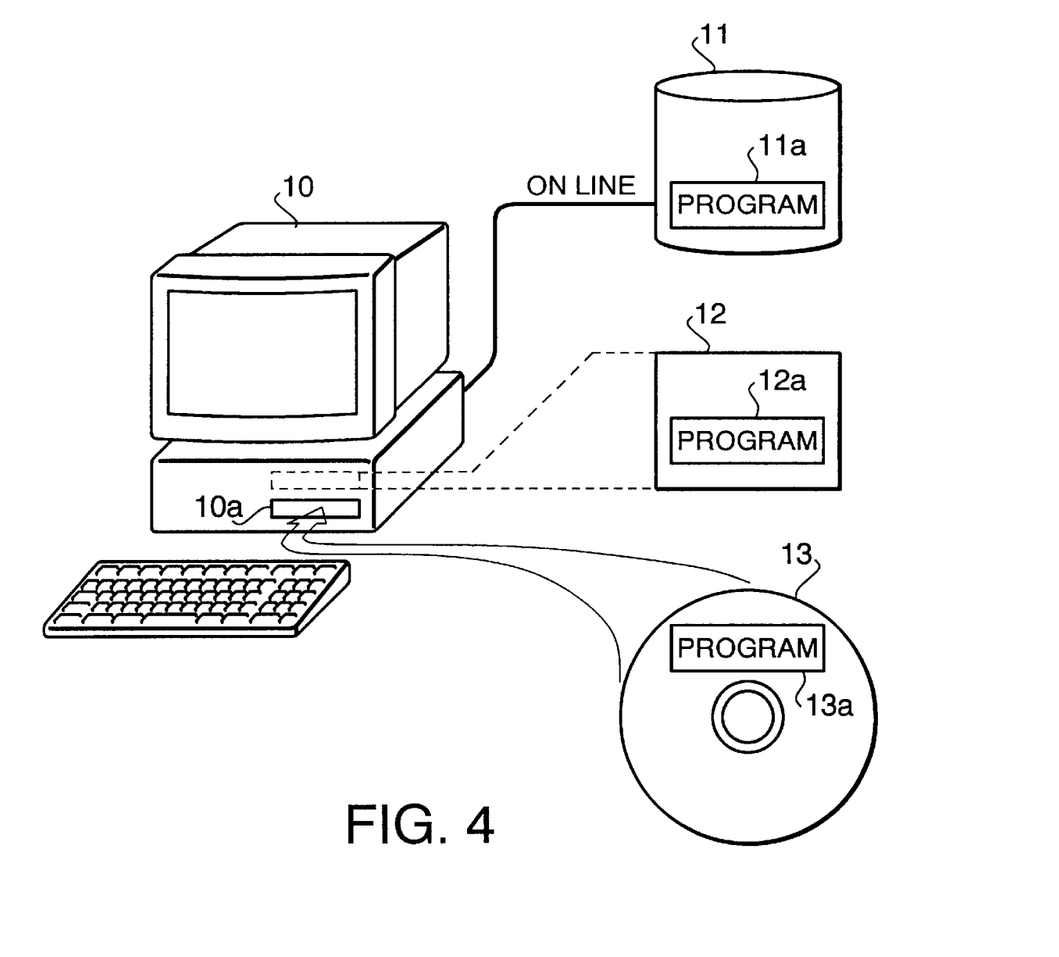
FIG. 4 is a diagram illustrating an embodiment of a computer usable medium (recording medium) according to the present invention.

FIG. 4 is a diagram showing a computer usable medium according to the present invention. The term "computer usable medium" in this specification and the appended claims covers any physical object in which a program to be executed by CPU or the like is stored. For example, the term "computer usable medium" includes a floppy disc, CD-ROM, hard disc drive, ROM, RAM, an optical recording medium such as DVD, a photo-magnetic recording medium such as MO, a magnetic recording medium such as magnetic tape, and a semiconductor memory such as IC card and miniature card. A program for having CPU or the like execute a part or all of the operations described in the above embodiments may be'stored in the "computer usable medium".

The program given as an example here includes a process for dividing a plaintext x into J parts in a plaintext vector m, a process for generating a random number vector r, and a process for preparing a ciphertext C by computing the scalar product of a base vector B (public-key vector c), and a message vector m', which combines the plaintext vector m, and random number vector. This program is stored in a computer usable medium described below. A computer or CPU 10 is provided at the entity of the sending side.

In FIG. 4, a first computer usable medium 11, which is connected online to the computer 10, is constituted by, for example, a World Wide Web (WWW) server computer, which is installed at a location distant from the computer 10. A program 11a is stored on the computer usable medium 11. The computer 10 prepares a ciphertext C in accordance with the program 11a, which is read out from the computer usable medium 11.

A second computer usable medium 12 disposed on the inside of the computer 10 is constituted by, for example, either a hard disk drive, or ROM which is installed internally. A, program 12a is stored on the computer usable medium 12. The computer 10 prepares a ciphertext C in accordance with the program 12a, which is read out from the computer usable medium 12.

A third computer usable medium 13, which is inserted in a disk drive 10a disposed in the computer 10, is constituted by, for example, a transportable magneto-optic disk, CD-ROM, or flexible disk, and a program 13a is stored on the computer usable medium 13. The computer 10 prepares a ciphertext C in accordance with the program 13a, which is read out from the computer usable medium 13.

As described above, with the present invention, since a base $B_i$ is set at $B_i = b_0 b_1 \ldots b_i$, and a message is expressed using multi-adic numbers, decryption can be performed at high speed. As a result, the present invention can contribute greatly toward paving the way for the realization of product-sum cryptosystem.

Further, with the present invention, since a plaintext is furnished with redundancy, that is, since a ciphertext is constituted from the scalar product of a plaintext vector, which divides an original plaintext to be encrypted, and a random number vector and/or a base vector, both of which do hot especially need to be encrypted, density can be increased, making LLL algorithm-based attacks extremely difficult, and making it possible to enhance security. As a result, this aspect of the present invention can also contribute greatly toward paving the way for the realization of product-sum cryptosystem.

The above described encryption method, decryption method, encryption/decryption method, cryptographic communications system, and computer usable medium are disclosed in Japanese Patent Application Nos. 10-262036 and 11-105815 filed in Japan on Sep. 16, 1998 and Apr. 13, 1999 respectively, the subject application claims priority of these Japanese Patent Applications, and the entire disclosures thereof are herein incorporated by reference.

What is claimed is:

1. An encryption method comprising the steps of:

providing a plaintext vector $m = (m_0, m_1, \ldots, m_{k-1})$, which divides a plaintext into K parts;

providing a base vector $B = (B_0, B_1, \ldots, B_{k-1})$ by setting $B_i$ ($0 \leq i \leq K-1$) to $B_1 = b_0 b_i \ldots b_i$ using an integer $b_i$; and producing a ciphertext $C = m_0 b_0 + m_1 b_1 + \ldots + m_{K-1} B_{K-1}$ using the plaintext vector m and base vector B, wherein the ciphertext $C = m_0 v_0 B_0 + m_1 v_1 B_1 + m_{K-1} v_{K-1} B_{K-1}$ is produced by further using a random number vector $v = (v_0, v_1, \ldots, v_{k-1})$.

2. The encryption method according to claim 1, wherein said K is a number to the power of 2.

3. The encryption method according to claim 1, wherein a plurality of groups of K terms of $b_1$ (i=0, 1, \ldots, K-1) are prepared, and a ciphertext is produced for each of these groups.

4. A decryption method for decrypting a ciphertext C, which is encrypted according to an encryption method shown below, the encryption method including the steps of:

providing a plaintext vector $m = (m_0, m_1, \ldots, m_{k-1})$, which divides a plaintext into K parts, providing a base vector $B = (B_0, B_1, \ldots, B_{k-1})$ by setting $B_i$ ($0 \leq i \leq K-1$) to $B_i = b_0 b_1 \ldots b_i$ using an integer $b_i$, and producing a ciphertext $C = m_0 b_0 + m_1 b_1 + \ldots + m_{K-1} B_{K-1}$ using the plaintext vector m and base vector B, wherein the ciphertext $C = m_0 v_0 B_0 + m_1 v_1 B_1 + m_{K-1} v_{K-1} B_{K-1}$ is further produced by using a random number vector $v = (v_0, v_1, \ldots v_{k-1})$;

the decryption method comprising the steps of:

determining plaintext vector $m = (m_0, m_1, \ldots, m_{k-1})$ from the ciphertext C according to the algorithm below:

Step 0

$$C_0 = C/b_0$$

$$m_0 = C_0 \pmod{b_1}$$

Step i (i=1, 2, \ldots, K-2)

$$C_i = (C_{i-1} - m_{i-1})/b_i$$

$$m_i = C_i \pmod{b_{i+1}}$$

Step K-1

$$m_{K-1} = (C_{K-2} - m_{K-2})/b_{K-1}; \text{ and}$$

obtaining the original plaintext from the plaintext vector m.

5. An encryption method comprising the steps of:

providing plaintext vector $m = (m_0, m_1, \ldots, m_{k-1})$, which divides a plaintext into K parts;

providing base vector $B = (B_0, B_1, \ldots, B_{k-1})$ by setting $B_i$ ($0 \leq i \leq K-1$) to $B_i = v_1 b_0 b_i \ldots b_i$ using integer $b_i$ and random number $v_i$; and producing ciphertext $C = m_0 b_0 + m_1 b_1 + \ldots + m_{K-1} B_{K-1}$ using the plaintext vector m and base vector B.

6. The encryption method according to claim 5, wherein a plurality of groups of K terms of $b_i$ (i=0, 1, ..., K−1) are prepared, and a ciphertext is produced for each of these groups.

7. An encryption/decryption method for converting a plaintext to a ciphertext, and for converting said ciphertext to an original plaintext, comprising the steps of:

providing plaintext vector m=$(m_0, m_1, \ldots, m_{k-1})$, which divides a plaintext into K parts;

providing base vector B=$(B_0, B_1, \ldots, B_{k-1})$ by setting said $B_i$ ($0 \leq i \leq K-1$) to $B_1 = b_0 b_i \ldots b_i$ using integer $b_1$;

selecting w, which satisfies w<P (P: prime number), and determining public-key vector c=$(c_0, c_1, \ldots, c_{K-1})$ according to Formula (a);

$$c_i = w B_i \pmod{P} \tag{a}$$

preparing ciphertext C shown in Formula (b) according to the scalar product of plaintext vector m and public-key vector c;

$$c = m_0 b_0 + m_1 c_1 + \ldots + m_{K-1} c_{K-1} \tag{b}$$

determining an interim decrypted text M for ciphertext C as described in Formula (c);

$$M = w^{-1} C \pmod{P} \tag{c}$$

determining plaintext vector m=$(m_0, m_1, \ldots, m_{k-1})$ by decrypting this interim decrypted text M according to the algorithm below:

Step 0

$$M_0 = M/b_0$$

$$m_0 \equiv M_0 \pmod{b_i}$$

Step i (i=1, 2, ..., K−2)

$$M_i = (M_{i-1} - m_{i-1})/b_i$$

$$m_i \equiv M_i \pmod{B_{i+1}}$$

Step K−1

$$m_{K-1} = (M_{K-2} - m_{K-2})/b_{K-1}; \text{ and}$$

obtaining the original plaintext from the plaintext vector m.

8. An encryption/decryption method for converting a plaintext to a ciphertext, and for converting said ciphertext to an original plaintext, comprising the steps of:

providing plaintext vector m=$(m_0, m_1, \ldots, m_{K-1})$, which divides a plaintext into K (K is a number to the power of 2) parts;

providing base vector B=$(B_0, B_1, \ldots B_{K-1})$ by setting said $B_i$ ($0 \leq i \leq K-1$) to $B_i = b_0 b_i \ldots b_i$ using integer $b_1$;

selecting w, which satisfies w<P (P: prime number), and determining public-key vector c=$(c_0, c_1, \ldots, c_{K-1})$ according to Formula (d);

$$c_i = w B_i \pmod{P} \tag{d}$$

preparing ciphertext C shown in Formula (e) according to the scalar product of plaintext vector m and public-key vector c;

$$c = m_0 b_0 + m_1 c_1 + \ldots + m_{K-1} c_{K-1} \tag{e}$$

determining an interim decrypted text M for ciphertext C as described in Formula (f);

$$M = w^{-1} C \pmod{P} \tag{f}$$

determining plaintext vector m=$(m_0, m_1, \ldots, m_{K-1})$ by decrypting this interim decrypted text M according to the algorithms below:

Two-part algorithm:
First Step $$ML \equiv M \pmod{B_{K/2}}$$

Second Step $$MR = (M - ML)/B_{K/2}$$

Highspeed algorithm:

The two-part algorithm is applied once again to ML, MR. The two-part algorithm is once again applied to each of the four parts of the interim decrypted text. This kind of process is repeated; and obtaining the original plaintext from the plaintext vector m.

9. An encryption/decryption method for converting plaintext to a ciphertext, and converting said ciphertext to an original plaintext, comprising the steps of:

providing plaintext vector m=$(m_0, m_1, \ldots, m_{K-1})$, which divides a plaintext into K parts;

providing base vector B=$(B_0, B_1, \ldots, B_{K-1})$ by setting said $B_i$ ($0 \leq i \leq K-1$) according to Formula (g);

$$B_i = v_0 b_0 b_1 \ldots b_i \tag{g}$$

Provided that:
$v_i$: random number
$b_i$: integer
gcd $(v_i, b_{i+1}) = 1$ selecting w, which satisfies w<P (P: prime number), and determining public-key vector c=$(c_0, c_1, \ldots, c_{K-1})$ according to Formula (h);

$$C_i = w B_i \pmod{P} \tag{h}$$

preparing ciphertext C shown in Formula (i) according to the scalar product of plaintext vector m and public-key vector c;

$$C = m_0 b_0 + m_1 c_1 + \ldots + m_{K-1} c_{K-1} \tag{i}$$

determining an interim decrypted text M for ciphertext C as described in Formula (j);

$$M = w^{-1} C \pmod{P} \tag{j}$$

determining plaintext vector m=$(m_0, m_1, \ldots, m_{K-1})$ by decrypting this interim decrypted text M according to the algorithm below:

Step 0

$$M_0 = C/b_0$$

$$m_0 \equiv M_0 v_0^{-1} \pmod{b_1}$$

Step i (i=1, 2, ..., K−2)

$$M_i = (M_{i-1} - m_{i-1} v_{i-1})/b_i$$

$$m_i \equiv M_i v_i^{-1} \pmod{b_{i+1}}$$

Step K-1

$$M_{K-1}=M_{K-2}-m_{K-2}v_{K-2})/b_{K-1}$$

$$m_{K-1}=M_{K-1}/v_{K-1};\text{ and}$$

obtaining the original plaintext from the plaintext vector m.

10. An encryption/decryption method for converting plaintext to a ciphertext, and converting said ciphertext to an original plaintext, comprising the steps of:

providing plaintext vector $m=(m_0, m_1, \ldots, m_{K-1})$, which divides a plaintext into K parts;

providing prime numbers P, Q;

providing two base vectors $B=(B_0, B_1, \ldots, B_{K-1})$ by setting first base vector $B_{Pi}$ ($0 \le i \le K-1$) to $B_{Pi}=b_{P0} b_{P1} \ldots b_{Pi}$ using integer $b_{Pi}$ and second base vector $B_{Qi}$ ($0 \le i \le K-1$) to $B_{Qi}=b_{Q0}b_{Q1} \ldots b_{Qi}$ using integer $b_{Qi}$;

using the Chinese Remainder Theorem to introduce a minimum integer $B_i$ so that the remainders resulting from P, Q constitute $B_{Pi}$, $B_{Qi}$, respectively;

selecting w, which satisfies $w<N$ ($N=PQ$), and determining public-key vector $c=(c_0, c_1, \ldots, c_{K-1})$ according to Formula (k);

$$c_i=wB_i(\bmod N) \quad (k)$$

preparing ciphertext C shown in Formula (l) according to the scalar product of plaintext vector m and public-key vector c;

$$C=m_0c_0+m_1c_1+\ldots+m_{K-1}c_{K-1} \quad (l)$$

determining interim decrypted texts $M_P$, $M_Q$ with moduli P, Q for ciphertext C as described in Formulas (m), (n) respectively;

$$M_P=w^{-1}C(\bmod P) \quad (m)$$

$$M_Q=w^{-1}C(\bmod Q) \quad (n)$$

determining plaintext vector $m=(m_0, m_1, \ldots, m_{K-1})$ by decrypting these interim decrypted texts $M_P$, $M_Q$ according to the algorithm below:

Step 0

$$M_{P0}=M_P/b_{P0}$$

$$M_{Q0}=M_Q/b_{Q0}$$

$$M_0^{(P)}=M_{P0}(\bmod b_{P1})$$

$$M_0^{(Q)}=M_{Q0}(\bmod b_{Q1})$$

$m_0$ is determined according to the Chinese Remainder Theorem,

Step i ($i=1, 2, \ldots, K-2$)

$$M_{Pi}=M_{Pi-1}-m_{i-1}/b_{Pi}$$

$$M_{Qi}=(M_{Qi-1}-m_{i-1}/b_{Qi}$$

$$M_i^{(P)}=M_{Pi}(\bmod b_{Pi+1})$$

$$M_i^{(Q)}=M_{Qi}(\bmod b_{Qi+1})$$

$m_i$ is determined according to the Chinese Remainder Theorem,

Step K-1

$$m_{K-1}=M_{PK-2}-m_{K-2}/b_{PK-1}$$

or $$m_{K-1}=M_{QK-2}-m_{K-2}/b_{QK-1};\text{ and}$$

obtaining the original plaintext from the plaintext vector m.

11. An encryption/decryption method according to claim 10, wherein said ciphertext C is sent having said N as the modulus.

12. A cryptographic communications system for carrying out data communications between a plurality of entities using ciphertext, the cryptographic communications system comprising:

an encryptor for preparing a ciphertext from a plaintext using the following encryption method;

the encryption method including the steps of:

providing a plaintext vector $m=(m_0, m_1, \ldots, m_{K-1})$, which divides a plaintext into K parts, providing a base vector $B=(B_0, B_1, \ldots, B_{K-1})$ by setting $B_i$ ($0 \le i \le K-1$) to $B_i=b_0b_1 \ldots b_i$ using an integer $b_i$, and producing a ciphertext $C=m_0B_0+m_1B_1+\ldots+m_{K-1}B_{K-1}$ using the plaintext vector m and base vector B, wherein the ciphertext $C=m_0v_0B_0+m_1v_1B_1+\ldots+m_{K-1}v_{K-1}B_{K-1}$ is produced by further using a random number vector $v=(v_0, v_1, \ldots, v_{K-1})$;

a communications channel for sending a prepared ciphertext from one entity to another entity; and a decryptor for decrypting a sent ciphertext to an original plaintext.

13. The cryptographic communications system according to claim 12, wherein said K is a number to the power of 2.

14. The cryptographic communications system according to claim 12, wherein a plurality of groups of K terms of $b_i$ ($i=0, 1, \ldots, K-1$) are prepared, and a ciphertext is produced for each of these groups.

15. A cryptographic communications system for carrying out data communications between a plurality of entities using ciphertext, the cryptographic communications system comprising:

an encryptor for preparing a ciphertext from a plaintext using the following encryption method;

the encryption method including the steps of:

providing plaintext vector $m=(m_0, m_1, \ldots, m_{K-1})$, which divides a plaintext into K parts, providing base vector $B=(B_0, B_1, \ldots, B_{K-1})$ by setting $B_i$ ($0 \le i \le K-1$) to $B_i=v_ib_0b_1 \ldots b_i$ using integer $b_i$ and random number $v_i$ and producing ciphertext $C=m_0B_0+m_1B_1+\ldots+m_{K-1}B_{K-1}$ using the plaintext vector m and base vector B;

a communications channel for sending a prepared ciphertext from one entity to another entity; and a decryptor for decrypting a sent ciphertext to an original plaintext.

16. The cryptographic communications system according to claim 15, wherein a plurality of groups of K terms of $b_i$ ($i=0, 1, \ldots, K-1$) are prepared, and a ciphertext is produced for each of these groups.

17. An encryption method for producing a ciphertext from a plaintext, comprising the steps of:

providing plaintext vector $m=(m_0, m_1, \ldots, m_{J-1})$, which divides a plaintext to be encrypted into J parts;

providing an arbitrary random number vector r=($r_J$, $r_{J+1}$, ..., $r_{K-1}$);

providing a base vector B=($B_0$, $B_1$, ..., $B_{K-1}$), which is set to $B_i$=$b_0b_1$ ... $b_i$ using integer $b_i$ (0≦i≦K-1); and producing ciphertext C=$m_0B_0$+$m_1B_1$+ ... +$m_{J-1}B_{J-1}$+$r_JB_J$+$r_{J+1}B_{J+1}$+ ... +$r_{K-1}B_{K-1}$ from the plaintext vector m, arbitrary random number vector r, and base vector B.

18. A decryption method for decrypting ciphertext C, which is encrypted according to an encryption method shown below, the encryption method including the steps of:

providing plaintext vector m=($m_0$, $m_1$, ..., $m_{J-1}$), which divides a plaintext to be encrypted into J parts, providing an arbitrary random number vector r=($r_J$, $r_{J+1}$, ..., $r_{K-1}$), providing a base vector B=($B_0$, $B_1$, ..., $B_{K-1}$), which is set to using integer $B_i$=$b_0b_1$ ... $b_i$ using integer $B_i$ (0≦i≦K-1), and producing ciphertext C=$m_0B_0$+$m_1B_1$+ ... +$m_{J-1}B_{J-1}$+$r_JB_J$+$r_{J+1}B_{J+1}$+ ... +$r_{K-1}B_{K-1}$ from the plaintext vector m, arbitrary random number vector r, and base vector B;

the decryption method comprising the steps of determining plaintext vector m=($m_0$, $m_1$, ..., $m_{J-1}$) from the ciphertext C according to the algorithm below and obtaining the original plaintext from the plaintext vector m:

Step 0

$$C_0 = C/b_0$$

$$m_0 \equiv C_0 \pmod{b_1}$$

Step i (i=1, 2, ..., J-1)

$$C_i = (C_{i-1} - m_{i-1})/b_i$$

$$m_i \equiv C_i \pmod{b_{i+1}}.$$

19. An encryption method comprising the steps of:

providing plaintext vector m=($m_0$, $m_1$, ..., $m_{J-1}$), which divides a plaintext to be encrypted into J parts;

providing an arbitrary random number vector r=($r_J$, $r_{J+1}$, ..., $r_{K-1}$);

providing a base vector B=($B_0$, $B_1$, ..., $B_{K-1}$), which is set to $B_i$=$v_1b_0b_1$ ... $b_i$ using an integer $b_i$ and random number $v_i$ (0≦i≦K-1), and producing ciphertext C=$m_0B_0$+$m_1B_1$+ ... +$m_{J-1}B_{J-1}$+$r_JB_J$+$r_{J+1}B_{J+1}$+ ... +$r_{K-1}B_{K-1}$ from the plaintext vector m, arbitrary random number vector r and base vector B.

20. An encryption/decryption method, which encrypts a plaintext to a ciphertext, and decrypts an encrypted ciphertext to an original plaintext, comprising the steps of:

providing plaintext vector m=($m_0$, $m_1$, ..., $m_{J-1}$), which divides a plaintext to be encrypted into J parts;

providing an arbitrary random number vector r=($r_J$, $r_{J+1}$, ..., $r_{K-1}$);

providing a base vector B=($B_0$, $B_1$, ..., $B_{K-1}$) by setting said $B_i$ (0≦i≦K-1) to $B_i$=$b_0b_1$ ... $b_i$ using an integer $b_i$;

selecting w, which satisfies w<P (P: prime number), and determining public-key vector c=($c_0$, $c_1$, ..., $c_{K-1}$) according to Formula (m);

$$c_i = wB_i \pmod{P} \tag{m}$$

preparing ciphertext C shown in Formula (n) according to the scalar product of plaintext vector m, random number vector r, and public-key vector c;

$$C = m_0c_0 + m_1c_1 + ... + m_{J-1}c_{J-1} + r_Jc_J + r_{J+1}c_{J+1} + ... + r_{K-1}c_{K-1} \tag{n}$$

determining an interim decrypted text M for ciphertext C as described in Formula (o);

$$M = w^{-1}C \pmod{P} \tag{o}$$

determining plaintext vector m=($m_0$, $m_1$, ..., $m_{J-1}$) by decrypting this interim decrypted text M according to the algorithm below:

Step 0

$$M_0 = M/b_0$$

$$m_0 \equiv M_0 \pmod{b_1}$$

Step i (i=1, 2, ..., J-1)

$$M_i = (M_{i-1} - m_{i-1})/b_i$$

$$m_i \equiv M_i \pmod{b_{i+1}}; \text{ and}$$

obtaining the original plaintext from the plaintext vector m.

21. An encryption/decryption method, which encrypts a plaintext to a ciphertext, and decrypts an encrypted ciphertext to an original plaintext, comprising the steps of:

providing plaintext vector m=($m_0$, $m_1$, ..., $m_{J-1}$) which divides a plaintext to be encrypted into J parts;

providing an arbitrary random number vector r=($r_J$, $r_{J+1}$, ..., $r_{K-1}$);

providing a base vector B=($B_0$, $B_1$, ..., $B_{K-1}$) by setting said $B_i$ (0≦i≦K-1) according to Formula (p);

$$B_i = v_ib_0b_1 ... b_i \tag{p}$$

Provided that:

$V_i$: random number $b_i$: integer gcd ($v_i$, $b_{i+1}$)=1 selecting w, which satisfies w<P (P: prime number), and determining public-key vector c=($c_0$, $c_1$, ..., $c_{K-1}$) according to Formula (q);

$$c_i = wB_i \pmod{P} \tag{q}$$

preparing ciphertext C shown in Formula (r) according to the scalar product of plaintext vector m, random number vector r, and public-key vector c;

$$C = m_0c_0 + m_1c_1 + ... + m_{J-1}c_{J-1} + r_Jc_J + r_{J+1}c_{J+1} + ... + r_{K-1}c_{K-1} \tag{r}$$

determining an interim decrypted text M for ciphertext C as described in Formula (s);

$$M = w^{-1}C \pmod{P} \tag{s}$$

determining plaintext vector m=($m_0$, $m_1$, ..., $m_J$) by decrypting this interim decrypted text M according to the algorithm below:

Step 0

$$M_0 = C/b_0$$

$$m_0 \equiv M_0b_0^{-1} \pmod{b_1}$$

Step i (i=1, 2, ..., J−1)

$$M_i = (M_{i-1} - m_{i-1}v_{i-1})/b_i$$

$$m_i = M_i v_1^{-1} \pmod{b_{i+1}}; \text{ and}$$

obtaining the original plaintext from the plaintext vector m.

22. A cryptographic communications system for carrying out data communications among a plurality of entities using ciphertext, comprising:

an encryptor for preparing a ciphertext from a plaintext using one of the following two encryption methods:

the first encryption method including the steps of: providing plaintext vector $m=(m_0, m_1, \ldots, m_{J-1})$, which divides a plaintext to be encrypted into J parts, providing an arbitrary random number vector $r=(r_J, r_{J+1}, \ldots, r_{K-1})$;

providing a base vector $B=(B_0, B_1, \ldots, B_{K-1})$, which is set to $B_i = b_0 b_1 \ldots b_i$ using an integer $b_i$ ($0 \leq i \leq K-1$), and producing ciphertext $C = m_0 B_0 + m_1 B_1 + \ldots + m_{J-1} B_{J-1} + r_J B_J + r_{J+1} B_{J+1} + \ldots + r_{K-1} B_{K-1}$ from the plaintext vector m, arbitrary random number vector r, and base vector B, and the second encryption method including the steps of:

providing plaintext vector $m=(m_0, m_1, \ldots, m_{J-1})$, which divides a plaintext to be encrypted into J parts, providing an arbitrary random number vector $r=(r_J, r_{J+1}, \ldots, r_{K-1})$;

providing a base vector $B=(B_0, B_1, \ldots, B_{K-1})$, which is set to $B_i = v_i b_0 b_1 \ldots b_i$ using an integer $b_i$ using integer and random number $v_i$ ($0 \leq i \leq K-1$), and producing ciphertext $C = m_0 B_0 + m_1 B_1 + \ldots + m_{J-1} B_{J-1} + r_J B_J + r_{J+1} B_{J+1} + \ldots + r_{K-1} B_{K-1}$ from the plaintext vector m, arbitrary random number vector r and base vector B;

a communications channel for sending a prepared ciphertext from one entity to another entity; and a decryptor for decrypting a sent ciphertext to an original plaintext.

23. A computer readable medium, which stores a program for producing by computer a ciphertext from a plaintext, the computer usable medium comprising:

first program coding means for causing said computer to produce a plaintext vector $m=(m_0, m_1, \ldots, m_{J-1})$ by dividing a plaintext to be encrypted into J parts;

second program coding means for causing said computer to produce an arbitrary random number vector $r=(r_J, r_{J+1}, \ldots, r_{K-1})$;

third program coding means for causing said computer to produce a base vector $B=(B_0, B_1, \ldots, B_{J-1})$, which is set to $B_i = b_0 b_1 \ldots b_i$ using integer $b_i$ ($0 \leq i \leq K-1$); and fourth program coding means for causing said computer to produce a ciphertext $C = m_0 B_0 + m_1 B_1 + \ldots + m_{J-1} B_{J-1} + r_J B_J + r_{J+1} B_{J+1} + \ldots + r_{K-1} B_{K-1}$ using said plaintext vector m, random number vector r, and base vector B.

24. A computer readable medium, which stores a program for producing by a computer a ciphertext from a plaintext, the computer usable medium comprising:

first program coding means for causing said computer to produce a plaintext vector $m=(m_0, m_1, \ldots, m_{J-1})$ by dividing a plaintext to be encrypted into J parts;

second program coding means for causing said computer to produce an arbitrary random number vector $r=(r_J, r_{J+1}, \ldots, r_{K-1})$;

third program coding means for causing said computer to produce a base vector $B=(B_0, B_1, \ldots, B_{J-1})$, which is set to $B_i = v_i b_0 b_1 \ldots b_i$ using integer $b_i$ and random number $v_i$ ($0 \leq i \leq K-1$); and fourth program coding means for causing said computer to produce a ciphertext $C = m_0 B_0 + m_1 B_1 + \ldots + m_{J-1} B_{J-1} + r_J B_J + r_{J+1} B_{J+1} + \ldots + r_{K-1} B_{K-1}$ using said plaintext vector m, random number vector r, and base vector B.

\* \* \* \* \*